United States Patent
Mula et al.

(10) Patent No.: US 6,890,503 B1
(45) Date of Patent: May 10, 2005

(54) SILICA ADDITIVE FOR USE IN RUBBERS AND SIMILAR CROSS-LINKED MATERIALS

(75) Inventors: Joseph A. Mula, Louisville, KY (US); Harvey Kaufman, Hudson, OH (US); Thomas A. Cole, Greeneville, TN (US)

(73) Assignee: Minop Co., Midway, TN (US)

( * ) Notice: Subject to any disclaimer, the term of this patent is extended or adjusted under 35 U.S.C. 154(b) by 0 days.

(21) Appl. No.: 10/135,206

(22) Filed: Apr. 30, 2002

(51) Int. Cl.$^7$ ............................................. C01B 33/26
(52) U.S. Cl. .................... 423/328.1; 423/331; 423/332; 423/333; 423/335; 423/155; 423/179; 524/492
(58) Field of Search .................... 524/442; 556/453, 556/178, 179

(56) References Cited

U.S. PATENT DOCUMENTS

| | | | | |
|---|---|---|---|---|
| 5,352,287 A | * | 10/1994 | Wason et al. | 106/416 |
| 6,080,805 A | * | 6/2000 | Kaufman | 524/47 |
| 6,090,857 A | * | 7/2000 | Tamburrino et al. | 516/20 |
| 6,133,362 A | * | 10/2000 | Kaufman | 524/450 |
| 6,136,897 A | * | 10/2000 | Kaufman | 524/47 |
| 6,288,045 B1 | | 9/2001 | Kaufman | |

* cited by examiner

*Primary Examiner*—David W. Wu
*Assistant Examiner*—Rip A Lee
(74) *Attorney, Agent, or Firm*—Steven A. Witters; Middleton Reutlinger

(57) ABSTRACT

The present development is a silica additive for use in rubbers and similar cross-linked materials having a silicon atom intercalated within an oxygenated framework. The additive may be prepared starting with crystalline, fused or amorphous silica powder, thereby reducing the cost of the additive as compared to using precipitated silica.

7 Claims, No Drawings

SILICA ADDITIVE FOR USE IN RUBBERS AND SIMILAR CROSS-LINKED MATERIALS

BACKGROUND

The present development is for a silica additive for use in rubbers and similar cross-linked materials having a silicon atom intercalated within an oxygenated framework. The additive can be used in rubbers, plastics or similar cross-linked materials to modify the physical characteristics of the material.

Specialty chemicals are frequently added to rubbers and plastics during the manufacturing process to aid in the production and life-expectancy of the finished product. For example, stearic acid and other high molecular weight fatty acids aid in the dispersion of filler materials, such as carbon black, in the rubber. Further, the additives may reduce the milling time required during processing.

Precipitated silica is a common additive in rubbers and plastics because it reinforces and strengthens the materials. Precipitated silica also acts as an abrasion resistance aid in rubber tires. But, raw precipitated silica is usually in a highly agglomerated state, of small ultimate particle size, and exhibits a large amount of particle surface area. Such agglomeration is difficult to eliminate during the rubber or plastic compounding process, resulting in a finished rubber or plastic compound that contains a significant number of precipitated silica agglomerates. The presence of these agglomerates, in combination with the relatively large amount of particle surface area, promotes the production of a finished product that may have a lower tensile strength, less elongation, poorer cure properties and lower tear strength than desired. Precipitated silica agglomeration can be reduced through the use of longer term or more intense compounding processes, but to do so increases the production time and costs.

Fused and crystalline silica can be processed to have a particle size similar to precipitated silica but, typically, a larger particle size distribution is used when using these forms of silica in other unrelated applications. The cost of processing fused and crystalline silica to a mesh size similar to precipitated silica is prohibitive, and along with health hazards associated with crystalline silica makes them unattractive as additives in rubber and plastics.

The present development uses fused silica and crystalline silica with typically available particle sizes in conjunction with a silica additive (HDI). The present development results in a compound that resists the formation of aggregates and more readily disperses in rubbers and plastics. The present development increases the physical properties of the rubber and plastics without adverse effects. The present development, which utilizes more readily available fused and crystalline silica, is also more economical to use than precipitated silica Thus, the fused and crystalline silica with HDI additive in the present development results in a more economic additive to the rubber/plastics industries with superior physical properties as compared to using precipitated silica as the additive.

SUMMARY OF THE INVENTION

The present development is a silica additive for use in rubbers and similar cross-linked materials having a silicon atom intercalated within an oxygenated framework. Specifically, the silica additive is a chelation complex having a silica center, polar hydroxy groups, aquo satellite ligands, and a pair of straight chain, dihydroxy tri-metallo ligands. The additive may be prepared starting with crystalline, fused or amorphous silica powder, thereby reducing the cost of the additive as compared to using precipitated silica. A prototypical additive has a silicon atom tetrahedrally coordinated to four oxygen atoms with adsorbed water associated with two of the oxygen atoms, and magnesium—alumino silicate chains appended from the other two oxygen atoms.

The silica additive may be added to rubbers and plastics during production. When added to rubber, the resultant rubber has physical characteristics essentially comparable to or better than rubber similarly treated with other precipitated silica additives.

DETAILED DESCRIPTION OF THE PRESENT DEVELOPMENT

The present development is a silica additive for use in rubbers and similar cross-linked materials. The additive resists the formation of aggregates and disperses rapidly in rubbers and plastics.

The silica additive is a chelation complex having a silica center, polar hydroxy groups, aquo satellite ligands, and a pair of straight chain, dihydroxy tri-metallo ligands and is believed to have the structure:

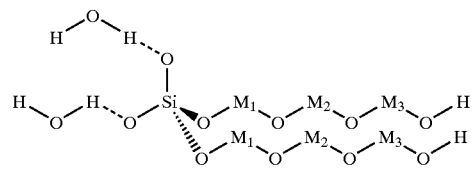

wherein a silicon atom is tetrahedrally coordinated to four oxygen atoms, and the dihydroxy tri-metallo ligands (identified as M1, M2 and M3 herein) are appended to two of the coordinated oxygen atoms. Adsorbed water molecules may be associated with the two remaining coordinated oxygen atoms.

The silica center may be derived from any silica source that produces silica powder having a particle size of from about −325 mesh to about −200 mesh. In the present invention, the silica source is preferably fused silica powder, amorphous silica powder, crystalline silica powder, precipitated silica with a particle size of from about −325 mesh to about −200 mesh, or a combination thereof.

The dihydroxy tri-metallo ligands are preferably zeolite-like branches. As is known in the art, zeolites are naturally occurring hydrated alumino-silicate complexes, which may further include calcium, sodium or a combination thereof. In the present invention, the dihydroxy tri-metallo ligands preferably include silicon and aluminum at the $M_1$ and $M_3$ positions, respectively:

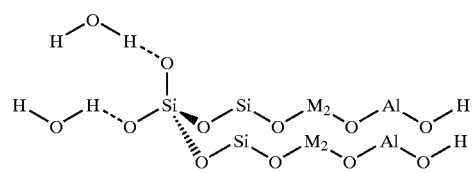

The $M_2$ position may be any Group II a metal, or any metal which can have a 2+ oxidation state and an octahedral coordination, or any Group Ia metal. For example, the $M_2$ position metal may be beryllium, magnesium, calcium, strontium, barium, scandium, titanium, vanadium, chromium, manganese, iron, cobalt, nickel, copper, zinc, yttrium, zirconium, niobium, molybdenum, ruthenium, palladium, cadmium, hafnium, tantalum, tungsten, rhenium, osmium, platinum, gold, lithium, sodium, potassium, rubidium, cesium, mercury, silver, rhodium, iridium or any combination thereof.

The silica additive may be prepared by a variety of techniques as are known in the art for making chelation complexes. For example, the silica additive wherein $M_1$ is silicon, $M_2$ is magnesium and $M_3$ is aluminum may be prepared by reacting fused silica with a zeolite based polymer modifying agent, such as described in U.S. Pat. No. 6,080,805, issued to Kaufman on Jun. 27, 2000 and incorporated herein by reference. Specifically, a predetermined amount of a magnesium-alumino silicate/calcium chloride/cornstarch compound prepared in accordance with teachings of the '805 patent is mixed in a Hinschel mixer or a similar type of mixer at medium to high speed (generally from about 1,500 rpm to about 2,200 rpm) and at a mixing temperature of from about 80° F. to about 180° F. as fused silica is added to the mixer. The mixing time ranges from about 10 minutes to about 45 minutes. The silica additive, $((H_2O)O)_2Si(O(Si-O-Mg-O-Al-OH))_2$, is recovered in powdered form. In an example composition, the magnesium aluminosilicate compound is added to the mixer at a concentration of not greater than about 20 wt % and the fused silica is added to the mixer at a concentration greater than about 80 wt %.

The powdered silica additive can then be added to a rubber or similar polymer as the rubber or polymer is being processed. When added to rubber, the additive increases tensile and tear strength, increases modulus, and generates a significantly lower number of potentially damaging agglomerates as compared to rubber treated with a non-silica additive or to rubber treated with a commercially available silica additive, Hi-Sil® 233 (available from PPG Industries, One PPG Place, Pittsburgh, Pa. 15272).

The following examples and associated performance data are representative of the silica additives which can be prepared in accordance with the present invention. The silica additives presented are intended for example purposes only and are not intended to be limiting in scope.

Example 1

A silica additive is prepared in accordance with the present invention by adding about 100 g of PPT-HDI (a magnesium-alumino silicate/calcium chloride/cornstarch compound manufactured by Polymer Process Technologies, Inc., Stow, Ohio) to a Hinschel mixer and mixing at high speed while about 900 g of fused silica is fed into the mixer in about 50 g doses. After the fused silica is completely added, the mixing speed is then reduced to about 1,700 rpm for about 10 minutes, and the silica additive, $((H_2O)O)_2Si(O(Si-O-Mg-O-Al-OH))_2$, is recovered in powdered form.

Examples 2–4

Rubber tire treads having the formulations shown in Table I are prepared and cured for about 20 minutes at about 307° C. As indicated in Table II, the cured treads are evaluated for tensile strength, percent elongation, 300% modulus, hardness, crescent tear and the presence of agglomerates.

TABLE I

| Ingredient | Example 2 | Example 3 | Example 4 |
|---|---|---|---|
| SMR-5[a] | 100 | 100 | 100 |
| Stearic acid | 2.5 | 2.5 | 2.5 |
| Zinc oxide | 3.5 | 3.5 | 3.5 |
| N-660 Ultra ®[b] | 30 | 30 | 30 |
| Min-Sil 20[c] | 35 | 0 | 0 |
| Hisil-233 ®[d] | 0 | 35 | 0 |
| Silica Additive | 0 | 0 | 35 |
| Nonox ZA[e] | 2.0 | 2.0 | 2.0 |
| CBS (Santocure)[f] | 0.8 | 0.8 | 0.8 |
| Sulfur | 2.0 | 2.0 | 2.0 |

[a]Standard Malaysian Rubber (natural rubber). Available from Akrochem, 255 Fountain Street, Akron, OH 44304
[b]Carbon black. Available from Columbian Chemicals Company, 1600 Parkwood Circle, Atlanta, GA 30339
[c]Additive. Available from Minco, Inc., Midway, TN 37804
[d]Additive. Available from PPG Industries, Pittsburgh, PA
[e]Oxidation inhibitor. Available from Akrochem, 255 Fountain Street, Akron, OH 44304
[f]Vulcanizing accelerator. Available from Akrochem, 255 Fountain Street, Akron, OH 44304

TABLE II

| Test | Example 2 | Example 3 | Example 4 |
|---|---|---|---|
| Tensile strength, PSI | 2900 | 3400 | 3600 |
| % Elongation | 670 | 595 | 600 |
| 300% Modulus, PSI | 690 | 892 | 900 |
| Shore A Hardness | 50 | 55 | 57 |
| Crescent Tear, IB/IN | 215 | 231 | 276 |
| Agglomerates in 2' × 2' cut | 15 | 11 | 1 |

Examples 5–11

Silica additives are prepared following the general procedure of Example 1 except that the relative amounts of PPT-HDI and of the fused silica are varied as specified in Table III.

TABLE III

|  | PPT-HDI | Fused Silica |
|---|---|---|
| Example 5 | 25 g | 975 g |
| Example 6 | 50 g | 950 g |
| Example 7 | 150 g | 850 g |
| Example 8 | 200 g | 800 g |
| Example 9 | 500 g | 500 g |
| Example 10 | 750 g | 250 g |
| Example 11 | 900 g | 100 g |

Examples 12–18

Silica additives are prepared following the general procedure of Example 1 except that the PPT-HDI is substituted by the dihydroxy tri-metallo ligands specified in Table IV.

TABLE IV

|  | Ligand |
|---|---|
| Example 12 | —O—Si—O—Ca—O—Al—OH |
| Example 13 | —O—Si—O—V—O—Al—OH |
| Example 14 | —O—Si—O—Mn—O—Al—OH |
| Example 15 | —O—Si—O—Zr—O—Al—OH |
| Example 16 | —O—Si—O—Pd—O—Al—OH |
| Example 17 | —O—Si—O—Ti—O—Al—OH |
| Example 18 | —O—Si—O—Ni—O—Al—OH |

When added to a cross-linked polymer, the additives of Examples 12–18 increase tensile and tear strength and has a relatively low number of potentially damaging agglomerates per unit area of polymer.

From a reading of the above, one with ordinary skill in the art should be able to devise variations to the inventive features. For example, the silica additive may be prepared starting with zeolite-like complexes other than magnesium alumino-silicate. These and other variations are believed to fall within the spirit and scope of the attached claims.

What is claimed is:

1. An additive to rubbers made by a process comprising the steps of:
    mixing a sodium magnesium alumino-silicate trihydrate compound at a first mixing speed of about 1,500 rpm to about 2,200 rpm;
    adding a silica compound selected from the group consisting of fused silica, amorhous silica, crystalline silica, precipitated silica and combinations thereof; and
    mixing at a second mixing speed, said second mixing speed being lower than said first mixing speed, for about 10 minutes to about 45 minutes.

2. The additive of claim 1 wherein said silica compound has a particle size from about −325 mesh to about −200 mesh.

3. A chelation complex being a product made by the process being a product made by the process comprising the steps of adding a predetermined amount of silica powder to a predetermined amount of a sodium magnesium alumino-silicate trihydrate compound while agitating the compound at a speed from about 1,700 rpm to about 2,000 rpm, and upon the complete addition of the silica powder, further agitating the resultant mixture at an agitation rate of about 1,700 rpm for a predetermined period of time.

4. The complex of claim 3 wherein said silica powder concentration is greater than 80 wt % and said sodium magnesium alumino-silicate trihydrate compound concentration is not greater than 20 wt %.

5. The complex of claim 3 wherein said silica powder has a particle size from about −325 mesh to about −200 mesh.

6. The complex of claim 3 wherein said silica powder is derived from the group consisting of fused silica powder, amorphous silica powder, crystalline silica powder, and precipitated silica.

7. The complex of claim 3 wherein said silica powder concentration is about 90 wt % and said sodium magnesium alumino-silicate trihydrate compound concentration is about 10 wt %.

* * * * *